UNITED STATES PATENT OFFICE.

ALFRED C. BEDORTHA, OF WINDSOR, CONNECTICUT, ASSIGNOR OF FOUR-TENTHS TO LAWRENCE L. BEDORTHA, OF WINDSOR, CONNECTICUT.

PROCESS OF TREATING TOBACCO.

1,262,622.      Specification of Letters Patent.      Patented Apr. 16, 1918.

No Drawing.      Application filed June 14, 1916. Serial No. 103,618.

*To all whom it may concern:*

Be it known that I, ALFRED C. BEDORTHA, a citizen of the United States, residing at Windsor, in the county of Hartford and State of Connecticut, have invented a new and useful Improvement in Processes of Treating Tobacco, of which the following is a specification.

My invention relates to an improvement in processes of treating tobacco, whereby it is made possible to better control the fermentation or sweating, and to give the tobacco a more desirable flavor than it would otherwise possess or acquire.

Tobacco before being prepared for use, and more especially cigar tobacco, is usually fermented. Investigators have tried by various methods of controlling the fermentation, to give to tobacco a predetermined taste, aroma, etc. One method has been by inoculating the tobacco to be fermented with a culture of known bacteria, allowing said bacteria to grow or develop on the tobacco, and later subjecting the tobacco to sweating. Another method has been by sterilizing the tobacco to first free it of all native microorganic life, and later to colonize on it known bacteria, so that by their growth and activity thereon the tobacco would, during fermentation or sweating, acquire a desirable flavor.

I have found that it is not the activity or growth of the organisms upon the tobacco which influences the fermentation or sweating, but that the fermentation or sweating is influenced by certain products of the growth of the bacteria which resemble the enzyms or unorganized ferments of certain industries, the action of which is little understood, and which ferments or enzyms are manifestly a part of the life of the bacterial cells and contained within their walls.

I have also found that it is not necessary to raise the bacteria upon the tobacco, but rather it is desirable to raise them removed from the tobacco as their growth can be more easily controlled when grown elsewhere.

One use of the invention is to give to tobacco a predetermined flavor different from that usually possessed by naturally fermented tobacco which is grown in the same section. Another use is in those cases where the flavor produced by fermentation under the influence of the fermenting power produced by nature would be acceptable if the controlling elements produced by nature were sufficient to ferment or sweat the tobacco to a desirable degree, but through unfavorable or adverse climatic conditions such controlling elements are not produced in sufficient quantities to desirably sweat the tobacco. In such cases the natural elements causing the fermentation can be supplemented by the use of growth products of bacteria living in, or inhabiting, the region in which the tobacco grows, produced artificially in sufficient quantity, but not necessarily selected or tested before use, thus causing the tobacco to sweat to a desirable degree with a consequent improvement in the flavor, burn, and general qualities of the tobacco.

My invention resides in the transfer to tobacco leaves, of bacterial cells containing living matter, which latter is capable, upon release from the cells, of bringing about certain desirable changes in the tobacco, whereby it acquires a desirable flavor. The method is based upon the production of bacterial cells, (which in nature grow upon the tobacco under uncontrollable conditions), removed from the tobacco and under controllable conditions, so that the results of fermentation or sweating obtained in the usual way customary in the art are controllable and more valuable.

To practically carry out the invention, bacteria are cultivated in a medium in which they will actively grow, preferably a water extract of tobacco leaves, and then transferred while in the active or vegetative stage, in sufficient quantity to the tobacco to be sweated, to convert the fermentable flavor producing material in the same to an acceptable flavor and aroma.

Bacteria are obtained from tobacco having the desired taste, aroma, etc., or from any other suitable source. Preferably a water extract of tobacco is prepared by boiling in fifty pounds of water one-half to one and one-half pounds of tobacco leaves which contain the particular fermentable material suitable for the growth of the bacteria. The extract is later sterilized, and into it the bacteria desired are placed, and maintained with bacteriological precautions under suitable conditions for their growth, until the necessary quantity are obtained, the time usually required being about twenty hours. The bacteria are usually aerobic and sufficient air must be supplied to allow them to grow submerged. The cells resulting from the growth of a pure culture, a mixed culture, or a mixture of the cells derived from two or more pure cultures, may be used. I consider it preferable to use the cells resulting from a mixture of the cells of two or more pure cultures.

The proper number of such cells to use upon any particular grade of tobacco will have to be determined by experience and depends upon the tobacco to be fermented, and upon the bacteria, since no definite number suitable for all kinds of tobacco and the various bacteria can be given.

I have found the enzyms or growth products contained in the living cells in three pounds of culture media, containing approximately 150,000,000 cells in each cubic centimeter, measuring approximately .0008 mm. in diameter by .00166—.00330 mm. long, to be sufficient to convert the fermentable flavor producing material in one pound of dry tobacco of one of the heavy grades of Connecticut tobacco to an acceptable flavor and aroma, without the further production of enzym or products of bacterial growth upon the tobacco. A greater quantity may be necessary with some tobacco, while less will be sufficient with other tobacco.

The cells are conveniently applied to the tobacco by removing them from the solution in which they grew, washing them with water to remove the culture media and suspending them in an amount of fresh water about equal in weight to the dry weight of the tobacco to be treated. This may be easily done by the use of a centrifugal filter or separator, or by passing the solution through a cream separator. A bowl four inches in diameter revolving twelve thousand revolutions per minute, or its equivalent, will be found to give the requisite centrifugal force, and the cells will be found clinging to the walls of the bowl while the liquid will be nearly free from cells. When a sufficient quantity of cells have collected in the interior of the filter or separator to hinder its free working, the machine is stopped, opened, and the cells removed from the wall of the bowl by washing with clear water. The process is repeated until the desired quantity is obtained. Or the cells may in certain cases, not requiring concentration or the application of more cells to a pound of tobacco then produced by one pound of culture media, be applied in the culture media in which they were produced, provided, however, that it be done before growth in the culture media has proceeded to such an extent that appreciable cell disintegration has taken place.

Before applying the cells containing the growth products to the leaves, the tobacco, which has usually been barn-cured, is preferably dried or otherwise brought into condition so as to open all the small folds of the leaves so that there will be no portions of the surface of the leaves protected from access of the liquid containing the cells, due to the leaves sticking or matting together. The tobacco may now be immersed in the liquid containing the cells so that the surface of the leaves may be evenly reached by the liquid and suspended cells.

It is also understood that any other method of applying the cells than the one mentioned may be used and that it can take place, if desired, at any other time than after the barn-curing of the leaves and that more than one application may be made if desired.

These products of bacterial growth or enzyms contained in the bacterial cells act upon certain fermentable flavor-producing constituents of the tobacco upon the disintegration of the cells, and it is sometimes desirable to supply the tobacco with additional fermentable flavor-producing material, which may be in the form of a water extract of other tobacco containing it.

The presence or absence of native bacteria, usually in the resting or spore stage, upon the tobacco is immaterial, inasmuch as the flavor is not dependent upon them but upon the action of the bacterial growth products; but if the undesirable growth products of the native bacteria are present in undesirable quantities, they ought to be rendered inactive. The destruction of these growth products is preferably accomplished by drying the tobacco and subjecting it to the action of hot air. A temperature of 212 degrees Fahrenheit for fifteen minutes will probably be sufficient.

After the growth products contained in the cells have been applied to the dried leaves as described above, the leaves are allowed to drain, to remove the excess water and cells, leaving the surface of the leaves moistened with the water containing the desired quantity of cells. The tobacco is next quickly dried completely, as by an artificial circulation of hot air to remove the excess liquid and to prevent the growth of any native or undesirable bacteria, and is then moistened properly for fermentation.

The amount of moisture in the tobacco when it is ready for fermentation is a matter of experience with the operator and is familiar to those skilled in the art, and varies from five per cent. to twenty per cent. of the weight of the leaf, depending upon the tobacco.

The tobacco, together with any adhering bacterial cells and growth products, and if desired, the additional fermentable flavor-producing material, is now packed in boxes or bales where it is allowed to remain in rooms at temperatures ordinarily used in the industry, namely seventy-five to eighty degrees Fahrenheit, until it is sufficiently sweated or aged for use. The time it ought to remain is indefinite, depending upon the judgment of the one practising the art, and depending upon the tobacco. Some grades would be ready in a few months, while others would require two years.

The addition of a fermentable flavor-producing material to be acted upon by the added bacterial growth products, as above described, may with advantage be adopted, particularly where low or second grade leaves of a crop are undergoing treatment. In such instances, a water extract prepared from the top or thicker leaves of the plants may be prepared and then added to the second grade leaves, thus furnishing the low grade leaves, deficient in fermentable material, with a suitable material for the action of the added bacterial growth products.

The fermentation of the treated tobacco in the boxes is indicated by a rapid and nearly uniform rise of temperature to several degrees above that of the sweating room where it is maintained at temperatures between seventy-five and eighty degrees Fahrenheit with the tobacco packed in boxes of one hundred and fifty to two hundred pounds at densities between twenty-five and thirty pounds to the cubic foot of box space, and containing five per cent. to twenty per cent. moisture. The fermentation is controlled by controlling the room temperature, the moisture of the tobacco, the density in the box, or in any other way desired, and after a few months the temperature falls to that of the room where it is allowed to remain, undergoing slow sweating or ripening until it is ready to be prepared for use.

By this method of sweating, bacterial growth on the tobacco causing the production of an enzym or bacterial growth products and a consequent production of flavor in the finished product does not take place due to the small amount of water in the tobacco and the aerobic nature of the bacteria; but, on the contrary, the necessary enzym is furnished by the rupture of the bacterial cells put upon the tobacco before it is packed in the cases. Sterilization of the tobacco to remove the native bacteria and spores is therefore not necessary, the essential step being that the growth products be supplied in the right quantity to complete the sweating before the tobacco is packed in the boxes or bales.

The method as described above gives an approximate method of measuring the quantity of enzym applied to the tobacco. The cells in a known quantity of culture media can be counted and measured under the microscope, giving a means of estimating from experience in the practice of the art the amount of growth products required to satisfactorily sweat the tobacco.

I claim,

1. A process of treating tobacco which consists in cultivating selected bacteria to develop growth products which are valuable in the fermentation of tobacco, adding to the tobacco the bacterial cells containing such growth products in sufficient quantity to ferment the tobacco to the desired flavor and aroma, and subjecting the tobacco to sweating under the influence of said added growth products.

2. A process of treating tobacco which consists in cultivating bacteria to develop growth products which are valuable in the fermentation of tobacco and of the same kind as would naturally reach the tobacco in the region of its growth, adding to the tobacco the bacterial cells containing such growth products in sufficient quantity to supplement nature and ferment the tobacco to the desired flavor and aroma, and subjecting the tobacco to sweating under the influence of said added growth products.

3. A process of treating tobacco as claimed in claim 1, in which the growth products contained in the bacterial cells are obtained from a plurality of pure cultures of selected bacteria.

4. A process of treating tobacco as claimed in claim 1, in addition to which a suitable fermentable flavor-producing material, obtained from other tobacco containing it, is added to the tobacco, prior to its sweating under the influence of the growth products transferred thereto while in the bacterial cells.

5. A process of treating tobacco as claimed in claim 1 and in claim 2 in which the bacterial cells containing the growth products are separated from the liquid in which they grew, prior to their addition to the tobacco to be treated.

6. A process of treating tobacco as claimed in claim 1, in which the tobacco to be treated is brought to a condition of dryness to expose an increased leaf surface to the action of the liquid containing the bacterial cells.

7. A process of treating tobacco as claimed in claim 1, in which the moisture content of the tobacco, after the addition of the bacterial cells containing the growth products, is changed, to bring it to the proper condition for sweating.

8. A process of treating tobacco as claimed in claim 1, in which the growth products of bacteria native to the tobacco are first rendered inactive, prior to the addition of the bacterial cells containing the growth products of value.

ALFRED C. BEDORTHA.

Witnesses:
GRACE M. ROBERTS,
CAROLINE C. DOWN.

Copies of this patent may be obtained for five cents each, by addressing the "Commissioner of Patents, Washington, D. C."